United States Patent [19]

Kato et al.

[11] Patent Number: 5,144,349
[45] Date of Patent: Sep. 1, 1992

[54] REAL IMAGE MODE VARIABLE MAGNIFICATION FINDER OPTICAL SYSTEM

[75] Inventors: Shigeru Kato, Hachiouji; Kazuteru Kawamura, Hino, both of Japan

[73] Assignee: Olympus Optical Co., Ltd., Tokyo, Japan

[21] Appl. No.: 718,283

[22] Filed: Jun. 20, 1991

[30] Foreign Application Priority Data

Jun. 21, 1990 [JP] Japan .................. 2-163640

[51] Int. Cl.$^5$ .................. G03B 13/12
[52] U.S. Cl. .................. 354/222
[58] Field of Search .................. 354/222

[56] References Cited

U.S. PATENT DOCUMENTS

| | | | |
|---|---|---|---|
| 4,842,395 | 6/1989 | Sato et al. | 350/519 |
| 4,906,078 | 3/1990 | Inabata et al. | 350/423 |
| 4,992,809 | 2/1991 | Nozaki et al. | 354/222 X |
| 5,014,078 | 5/1991 | Kudo et al. | 354/222 X |

FOREIGN PATENT DOCUMENTS 61-156018 7/1986 Japan .
64-65519 3/1989 Japan .
1-131510 5/1989 Japan .
1-257817 10/1989 Japan .

*Primary Examiner*—Michael L. Gellner
*Attorney, Agent, or Firm*—Cushman, Darby & Cushman

[57] ABSTRACT

The real image mode variable magnification finder optical system comprises an objective which consists of a first lens component having a negative refractive power, a second lens component having a positive refractive power and a third lens component having a positive refractive power, and an eyepiece having a positive refractive power. For variation of magnification and correction of diopter, the second lens component and the third lens component are moved, while the first lens component is kept stationary, so as to set the airspace reserved therebetween at a maximum width thereof in the vicinity of a middle field angle. This finder optical system has a variable magnification ratio which is substantially higher than 2, can correct aberration favorably, permits shortening total length of the finder section thereof and can be manufactured at a low cost.

4 Claims, 9 Drawing Sheets

REAL IMAGE MODE VARIABLE MAGNIFICATION FINDER OPTICAL SYSTEM

BACKGROUND OF THE INVENTION a) Field of the Invention

The present invention relates to a real image mode variable magnification finder optical system designed separately from a photographing optical system and intended for use with photographic cameras, video cameras, etc, and more specifically to a real image mode variable magnification finder optical system which comprises, in the order from the object side, an objective having a positive refractive power and an eyepiece having a positive refractive power.

b) Description of the Prior Art

The inverse Galilean finder optical system is known well as a finder optical system comprising a photographing system and a finder system which are designed separately. However, the finder optical system of this type has defects that the visual field frame may not be observed clearly and that clear observation of the visual field itself is hindered due to the ghost and flare produced by the half mirror used for forming the visual field frame.

In contrast, the Keplerian finder optical system, which is adapted so as to allow observation through an eyepiece optical system of a real image formed by an objective optical system, corrects the defects of the inverse Galilean finder optical system almost completely and assures clear observation.

As examples of the Keplerian finder optical system which have a variable magnification function, there are known a zoom type finder optical system consisting of two lens components and another zoom type finder optical system whose objective system consists of three lens components. The former type is exemplified by the finder optical systems disclosed by Japanese Patents Preliminary Publication Nos. Sho 61-156018, Sho 64-65519 and Hei 1-257817. Further, known as the latter type is the finder optical system proposed by Japanese Patent Preliminary Publication No. Hei 1-131510.

However, the former type has a defect that it has a low variable magnification ratio though it permits shortening the total length of the finder section due to a fact that it has a relatively long distance as measured from the final surface of the objective to the intermediate image surface, i.e., a relatively long back focal length, and permits folding the optical path by arranging a first reflecting surface for image erection within the range of the back focal length.

On the other hand, the latter type can easily have a variable magnification ratio of 2 or higher. In addition, when attention is paid only to the wide-angle position of the latter type wherein the finder optical system has a short length as measured from the first lens component to the third lens component thereof and a long back focal length, the latter type seems to permit folding the optical path, like the former type, by arranging a first reflecting surface between the third lens component and the intermediate image surface. However, the latter type has a very short back focal length at the telephoto position thereof and does not actually permit interposing the first reflecting surface within the range of back focal length, thereby obliging to arrange the first reflecting surface after the intermediate image surface. Consequently, the latter type has a defect that it has a long distance as measured from the first lens component to the intermediate image surface and does not permit shortening the total length of the finder section.

SUMMARY OF THE INVENTION

In view of the problems described above, it is a primary object of the present invention to provide a real image mode variable magnification finder optical system which is designed separately from a photographing optical system, has a variable magnification ratio on the order of 2 or higher, permits shortening total length of the finder section thereof, favorably corrects aberrations and can be manufactured at a low cost.

In a formation of the present invention, the real image mode variable magnification finder optical system is characterized in that the objective comprises a first lens component having a negative refractive power, a second lens component having a positive refractive power and a third lens component having a positive refractive power with a first reflecting surface for image erection interposed between the third lens component and the intermediate image surface, and that variation of magnification and correction of diopter are performed by moving the second lens component and the third lens component along the optical axis, with the first lens component kept stationary, so as to obtain a maximum airspace between the second lens component and the third lens component in the vicinity of the middle field angle.

In another formation of the present invention, the real image mode variable magnification finder optical system is characterized not only by the composition described above but also in that the object side surface and the image side surface of the second lens component are convex toward the object side, and that the second lens component and the third lens component satisfy the conditions (1) and (2) mentioned below:

$$-2 < \frac{r_{21} - r_{20}}{r_{21} + r_{20}} < 0.2 \tag{1}$$

$$0 < \frac{r_{30} - r_{21}}{r_{30} + r_{21}} < 0.6 \tag{2}$$

wherein the reference symbol $r_{21}$ represents the radius of curvature on the image side surface of the second lens component, the reference symbol $r_{20}$ designates the radius of curvature on the object side surface of the second lens component and the reference symbol $r_{30}$ denotes the radius of curvature on the object side surface of the third lens component.

In the real image mode variable magnification finder optical system according to the present invention, both the second lens component and the third lens component are moved for performing variation of magnification and correction of diopter at the same time. Speaking more concretely, the second lens component and the third lens component, both of which have positive refractive powers, are moved from the side of the eyepiece toward the object side for variation from a low magnification (wide-angle position) to a high magnification (telephoto position). Since the intermediate image surface is deviated (diopter is deviated) by the variation of magnification, the deviation of the image surface (the deviation of diopter) is corrected by varying the airspace reserved between the second lens component and the third lens component.

When the total magnification of the second lens component and the third lens component is represented by $\beta_{23}$, the intermediate image surface is deviated toward the object for a longest distance at a point where $|\beta_{23}|$ is set at 1, and the airspace reserved between the second lens component and the third lens component is set the widest at this point for correcting the deviation of the intermediate image surface. When the total magnification is varied within a range of $|\beta_{23}| \geqq 1$, not only the airspace reserved between the second lens component and the third lens component but also the airspace reserved between the first lens component and the second lens component becomes the widest at the low magnification, whereby the objective cannot have a back focal length long enough to permit arranging the first reflecting surface between the third lens component and the intermediate image surface, and the finder section has a long total length. When the total magnification is varied within a range of $|\beta_{23}| \leqq 1$, on the other hand, the intermediate image surface is deviated at high magnification for a distance, which is longer than the deviation distance at the low magnification, and the airspace reserved between the second lens component and the third lens component must be varied for correcting the deviation for a distance longer than the that required for the variation of the airspace at the low magnification whereby the third lens component is moved further toward the eyepiece from the location of the third lens component at the low magnification. Consequently, the objective cannot have a sufficiently long back focal length and the finder section has a long total length.

In the finder optical system according to the present invention, the total magnification $|\beta_{23}|$ is set at 1 in the vicinity of the middle magnification (in the vicinity of the middle field angle) so that the airspace reserved between the second lens component and the third lens component is the widest at the middle point between the low magnification and the high magnification. Accordingly, at the low magnification, the airspace reserved between the second lens component and the third lens component is narrow enough to allow the objective to have a sufficiently long back focal length, and at the high magnification, the third lens component is moved toward the object side from the location thereof at the low magnification so as to allow the objective to have a sufficiently long back focal length, thereby allowing arrangement of first reflecting member between the third lens component and the intermediate image surface and permitting shortening the total length of the finder section. Needless to say, no problem is posed, so far as the objective can have a back focal length long enough to allow arrangement of the first reflecting member, by moving the third lens component toward the eyepiece at any intermediate magnification for a short distance from the location thereof at the low magnification.

Further, it is possible to obtain an erect image by interposing, between the objective and the eyepiece, an optical means such as a mirror optical system comprising optical elements functioning to reflect the imaging rays only once and to erect an intermediate image, a Porro Prism, and an image rotator or an optical system having a single imaging surface.

In order to shorten the total length of the finder section, it is desirable to locate the principal point of the second lens component outside this lens component on the side of the first lens component by designing the second lens component as a whole so as to have a meniscus shape convex toward the object side, because interference may be caused between the lens components adjacent to each other, especially between the first lens component and the second lens component, by shortening the total length of the objective in a condition where the principal point of the second lens component is located within this lens component. When the location of the second lens component is shifted toward the eyepiece by locating the principal point of the second lens component outside this lens component on the side of the first lens component, it is possible to reserve the required airspace between the first lens component and the second lens component.

Further, it is desirable that the conditions, (1) and (2) are satisfied by the radii of curvature $r_{20}$, $r_{21}$ and $r_{30}$ on the surface of incidence and the surface of emergence of the second lens component, and the surface of incidence of the third lens component respectively. If the lower limit of the condition (1) is exceeded, distortion will be remarkable on the negative side at low magnification. If the upper limit of the condition (1) is exceeded, in contrast, spherical aberration and coma will be varied remarkably by the variation of magnification, thereby degrading the imaging performance of the finder optical system. If the lower limit of the condition (2) is exceeded, curvature of field will be remarkable on the negative side at high magnification. If the upper limit of the condition (2) is exceeded, in contrast, distortion will be varied remarkably by the variation of magnification.

Furthermore, it is desirable, for obtained good balance between astigmatism and coma while reducing distortion at both the low magnification and the high magnification, to use at least one aspherical surface in the second lens component and at least one aspherical surface in the third lens component.

Moreover, the finder optical system according to the present invention, in which the first lens component is kept stationary for the variation of magnification, may not be equipped with a cover glass which is generally used for preventing dust from entering the interior of an optical system and can therefore be manufactured at low cost, and permits further shortening the total length of the finder section.

These and other objects as well as the features and the advantages of the present invention will become apparent from the following detailed description of the preferred embodiments when taken in conjunction with the accompanying drawings.

DESCRIPTION OF THE PREFERRED EMBODIMENTS

Now, the present invention will be described in more detail below with reference to the preferred embodiments illustrated in the accompanying drawings.

Embodiment 1

Figure 1:
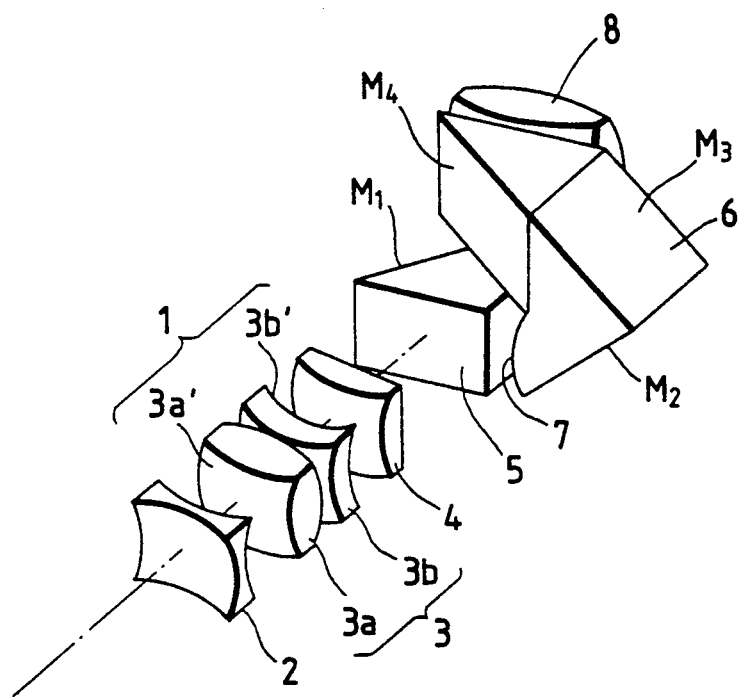
FIG. 1 is a perspective view of Embodiment 1 of the real image mode variable magnification finder optical system according to the present invention.

FIG. 1 is a perspective view illustrating Embodiment 1 of the real image mode variable magnification finder optical system according to the present invention. In this drawing, the reference numeral 1 represents an objective comprising a first fixed lens component 2 which consists of a single negative lens element, a second lens component 3 which consists of a positive lens element 3a and a negative lens element 3b, and has a positive power as a whole, and a third movable lens component 4 which has a positive refractive power. The second lens component 3 has an object side surface $3a'$ and an image side surface $3b'$ both of which are convex toward the object side. The reference numeral 5 designates a prism having a first reflecting surface $M_1$ and the reference numeral 6 denotes another prism which has second, third and fourth reflecting surfaces $M_2$, $M_3$ and $M_4$, these prisms composing an image erecting optical system. Arranged in coincidence with the vertex of the surface of incidence of the prism 6 is a visual field frame 7, in which the intermediate image surface of the objective 1 is located. That is to say, the first reflecting surface $M_1$ is arranged between the third lens component 4 and the intermediate image surface. The reference numeral 8 represents an eyepiece.

Figure 2:
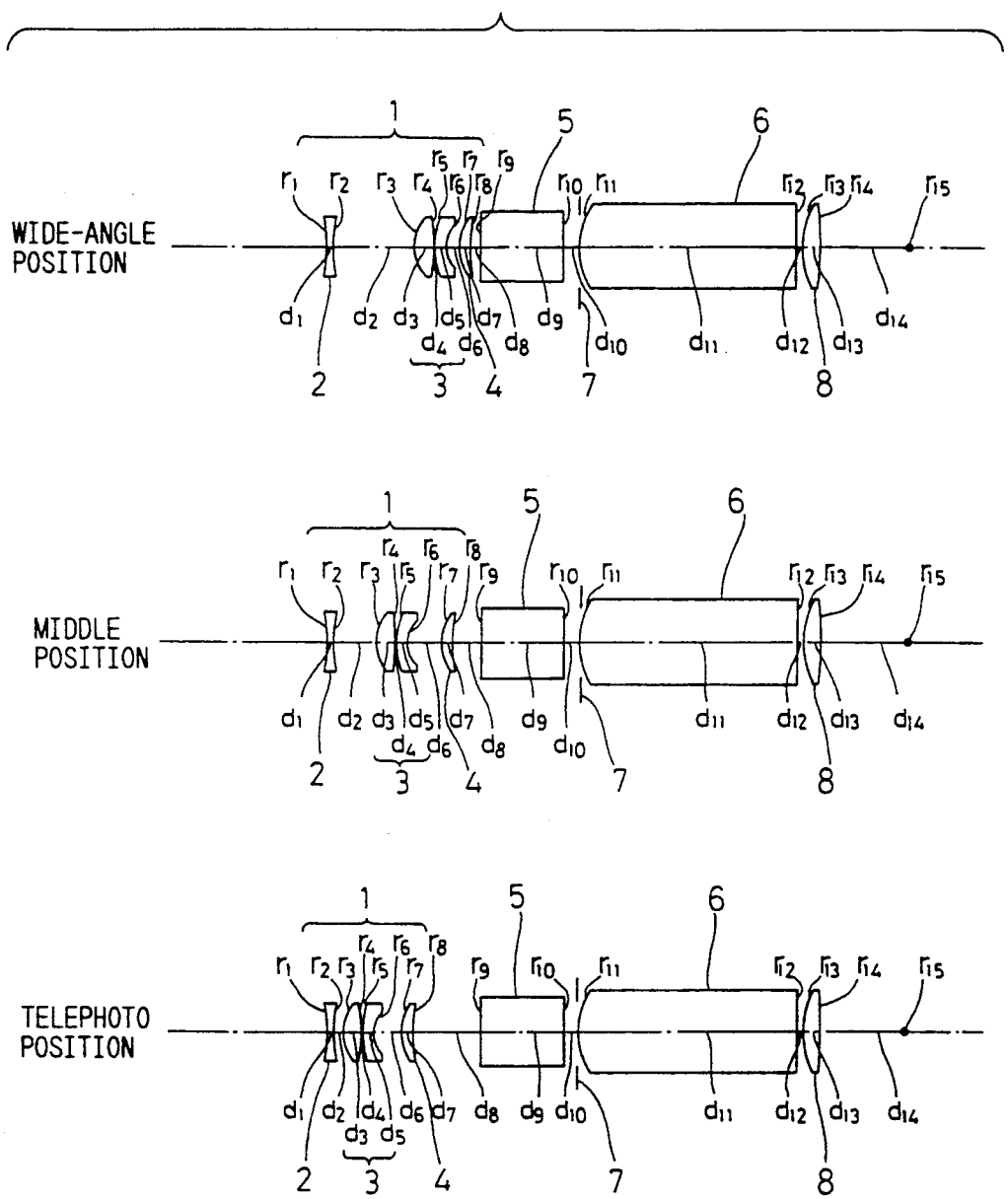
FIG. 2 and FIG. 3 are development views and graphs illustrating compositions and aberration characteristics respectively at the wide-angle position, middle position and telephoto position of Embodiment 1.
Figure 3:
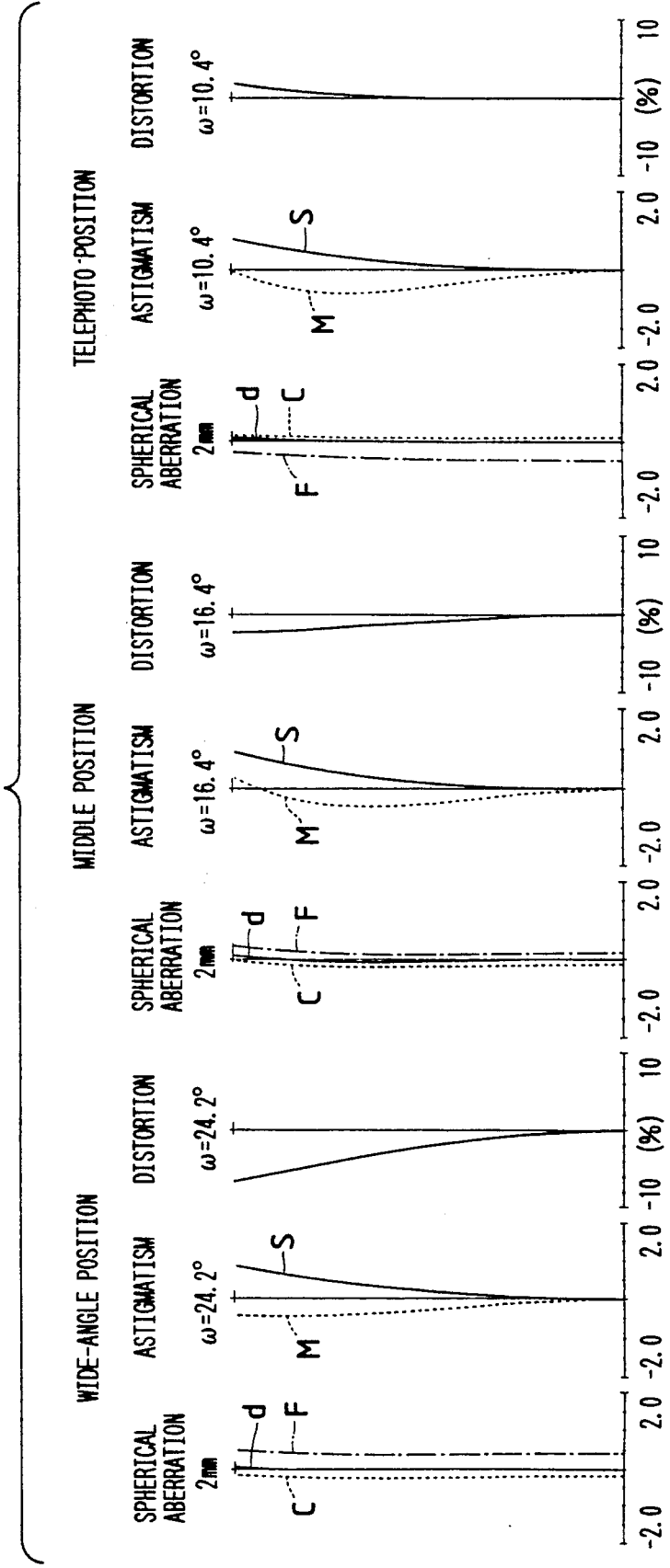

Illustrated in FIG. 2 and FIG. 3 are the compositions and aberration characteristics respectively at the wide-angle position, middle position and telephoto position of Embodiment 1. The numerical data adopted for designing Embodiment 1 are listed below:

| Magnification 0.49~1.13, Field angle $(2\omega) = 48.5° \sim 20.8°$ | | | |
|---|---|---|---|
| $r_1 = -19.9600$ | | | |
| | $d_1 = 1.0000$ | $n_1 = 1.58362$ | $\nu_1 = 30.37$ |
| $r_2 = 21.8554$ (aspherical surface) | | | |
| | $d_2$ (variable) | | |
| $r_3 = 5.2373$ (aspherical surface) | | | |
| | $d_3 = 2.5594$ | $n_2 = 1.49230$ | $\nu_2 = 57.71$ |
| $r_4 = -29.3871$ | | | |
| | $d_4 = 0.2000$ | | |
| $r_5 = 10.6419$ | | | |
| | $d_5 = 1.5565$ | $n_3 = 1.58362$ | $\nu_3 = 30.37$ |
| $r_6 = 4.3859$ | | | |
| | $d_6$ (variable) | | |
| $r_7 = 6.7023$ (aspherical surface) | | | |
| | $d_7 = 1.5147$ | $n_4 = 1.49230$ | $\nu_4 = 57.71$ |
| $r_8 = 18.9477$ | | | |
| | $d_8$ (variable) | | |
| $r_9 = \infty$ | | | |
| | $d_9 = 11.5000$ | $n_5 = 1.49230$ | $\nu_5 = 57.71$ |
| $r_{10} = \infty$ | | | |
| | $d_{10} = 2.0000$ | | |
| $r_{11} = 10.6666$ | | | |
| | $d_{11} = 30.0000$ | $n_6 = 1.49230$ | $\nu_6 = 57.71$ |
| $r_{12} = \infty$ | | | |
| | $d_{12} = 0.7000$ | | |
| $r_{13} = 11.8454$ (aspherical surface) | | | |
| | $d_{13} = 2.2473$ | $n_7 = 1.49230$ | $\nu_7 = 57.71$ |
| $r_{14} = -82.8135$ | | | |
| | $d_{14} = 15.0000$ | | |
| $r_{15}$ (eyepoint) | | | |

| Aspherical coefficients |
|---|
| Second surface |
| $E = -0.18872 \times 10^{-3}$, $F = 0.18942 \times 10^{-4}$, $G = -0.77279 \times 10^{-6}$ |
| Third surface |
| $E = -0.90226 \times 10^{-3}$, $F = 0.55752 \times 10^{-5}$, $G = -0.14667 \times 10^{-5}$ |
| Seventh surface |
| $E = -0.28709 \times 10^{-3}$, $F = -0.43221 \times 10^{-5}$, $G = -0.15985 \times 10^{-6}$ |
| Thirteenth surface |
| $E = -0.12848 \times 10^{-3}$, $F = 0.43360 \times 10^{-6}$, $G = -0.85149 \times 10^{-8}$ |

| | wide-angle | middle | telephoto |
|---|---|---|---|
| $d_2$ | 11.029 | 5.768 | 1 |
| $d_6$ | 1.728 | 4.559 | 3.855 |
| $d_8$ | 1.466 | 3.895 | 9.367 |

Condition (1) −0.088
Condition (2) 0.209

Embodiment 2

Figure 4:
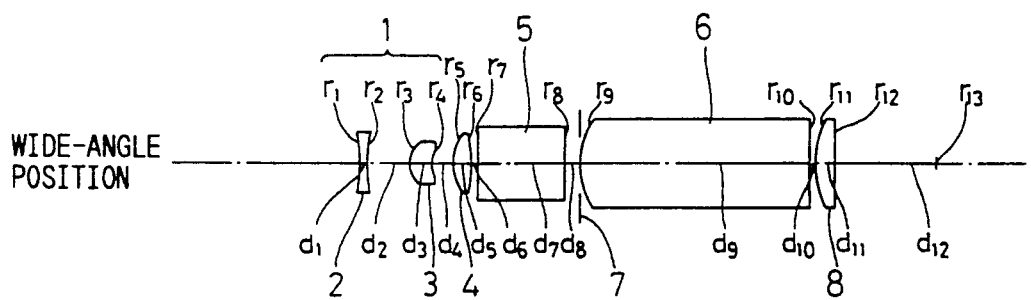
FIG. 4 and FIG. 5 are a development view illustrating compositions at the wide-angle position of Embodiment 2 of the present invention and graphs visualizing aberration characteristics at the wide-angle position, middle position and telephoto position thereof.

Embodiment 2 has the composition illustrated in FIG. 4, wherein the objective comprises a second lens component consisting of three positive lens elements and the other lens components having the same compositions as those of the second lens component and the third lens component used in Embodiment 1.

Figure 5:
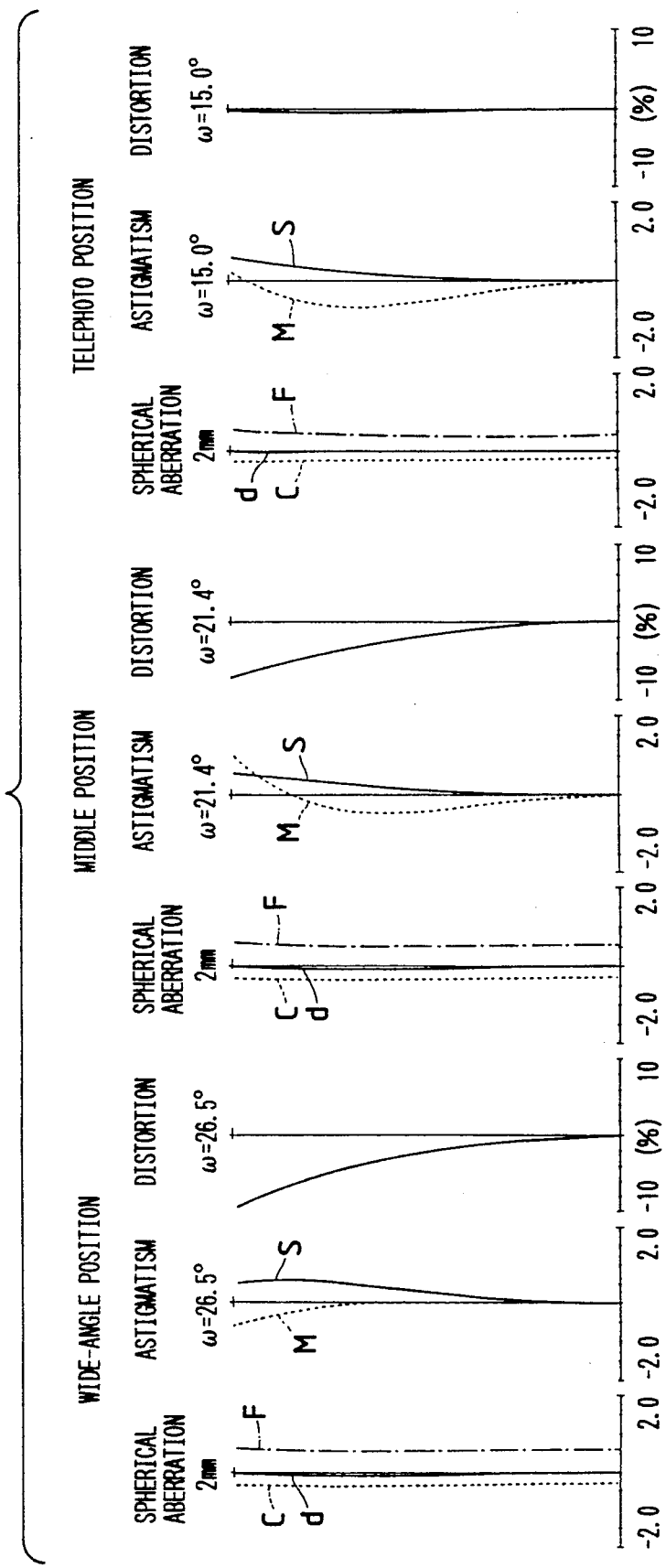

Visualized in FIG. 5 are the aberration characteristics at the wide-angle position, middle position and telephoto position of Embodiment 2. The numerical data adopted for designing Embodiment 2 are tabulated below:

| Magnification 0.45~0.79, Field angle $(2\omega) = 53.0° \sim 29.9°$ | | | |
|---|---|---|---|
| $r_1 = -17.8836$ | | | |
| | $d_1 = 1.0000$ | $n_1 = 1.58362$ | $\nu_1 = 30.37$ |
| $r_2 = 12.6197$ (aspherical surface) | | | |
| | $d_2$ (variable) | | |
| $r_3 = 2.9302$ (aspherical surface) | | | |
| | $d_3 = 2.8486$ | $n_2 = 1.49230$ | $\nu_2 = 57.71$ |
| $r_4 = 3.0113$ | | | |
| | $d_4$ (variable) | | |
| $r_5 = 5.5548$ (aspherical surface) | | | |
| | $d_5 = 2.2399$ | $n_3 = 1.49230$ | $\nu_3 = 57.71$ |
| $r_6 = -36.5869$ | | | |
| | $d_6$ (variable) | | |
| $r_7 = \infty$ | | | |
| | $d_7 = 11.5000$ | $n_4 = 1.49230$ | $\nu_4 = 57.71$ |
| $r_8 = \infty$ | | | |
| | $d_8 = 2.0000$ | | |
| $r_9 = 10.1590$ | | | |
| | $d_9 = 30.0000$ | $n_5 = 1.49230$ | $\nu_5 = 57.71$ |
| $r_{10} = \infty$ | | | |
| | $d_{10} = 0.7000$ | | |
| $r_{11} = 11.6901$ (aspherical surface) | | | |
| | $d_{11} = 2.6163$ | $n_6 = 1.49230$ | $\nu_6 = 57.71$ |
| $r_{12} = -91.2652$ | | | |
| | $d_{12} = 15.0000$ | | |
| $r_{13}$ (eyepoint) | | | |

| Aspherical coefficients |
|---|
| Second surface |
| $E = -0.54981 \times 10^{-3}$, $F = 0.61371 \times 10^{-4}$, $G = -0.83405 \times 10^{-6}$ |

-continued

Third surface
E = −0.35455 × $10^{-2}$, F = −0.10891 × $10^{-3}$,
G = −0.42710 × $10^{-4}$
Fifth surface
E = −0.11841 × $10^{-2}$, F = 0.75238 × $10^{-6}$,
G = −0.54410 × $10^{-6}$
Eleventh surface
E = −0.10537 × $10^{-3}$, F = 1.3226 × $10^{-5}$,
G = −0.17672 × $10^{-7}$

|  | wide-angle | middle | telephoto |
|---|---|---|---|
| $d_2$ | 5.666 | 3.187 | 1 |
| $d_6$ | 2.929 | 3.555 | 2.678 |
| $d_8$ | 1 | 2.853 | 5.917 |

Condition (1) −0.014
Condition (2) 0.297

Embodiment 3

Figure 6:
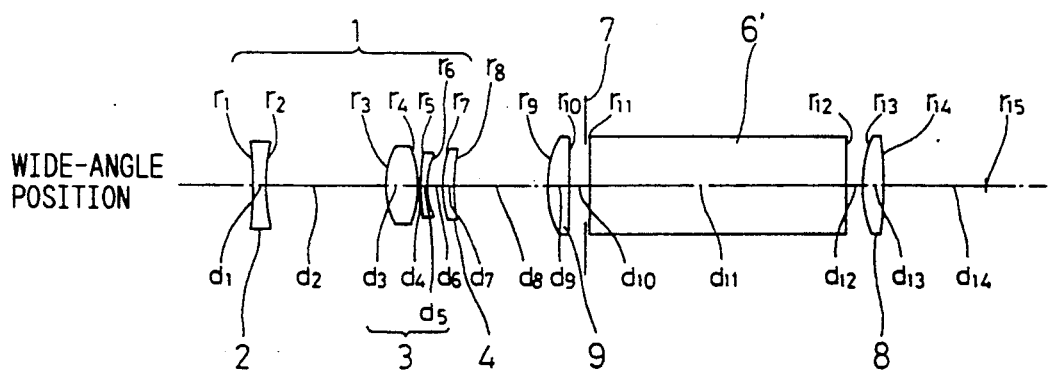
FIG. 6 and FIG. 7 are a development view illustrating composition at the wide-angle position of Embodiment 3 and graphs visualizing aberration characteristics at the wide-angle position, middle position and telephoto position thereof.

Embodiment 3 has the composition illustrated in FIG. 6, wherein an image erecting optical system is composed of a mirror (not shown) serving as the first reflecting mirror $M_1$, a field lens 9 and a prism 6' which has the second through fourth reflecting surfaces $M_2$ through $M_4$, and the surface of incidence of the prism 6' is selected as the intermediate image surface.

Figure 7:
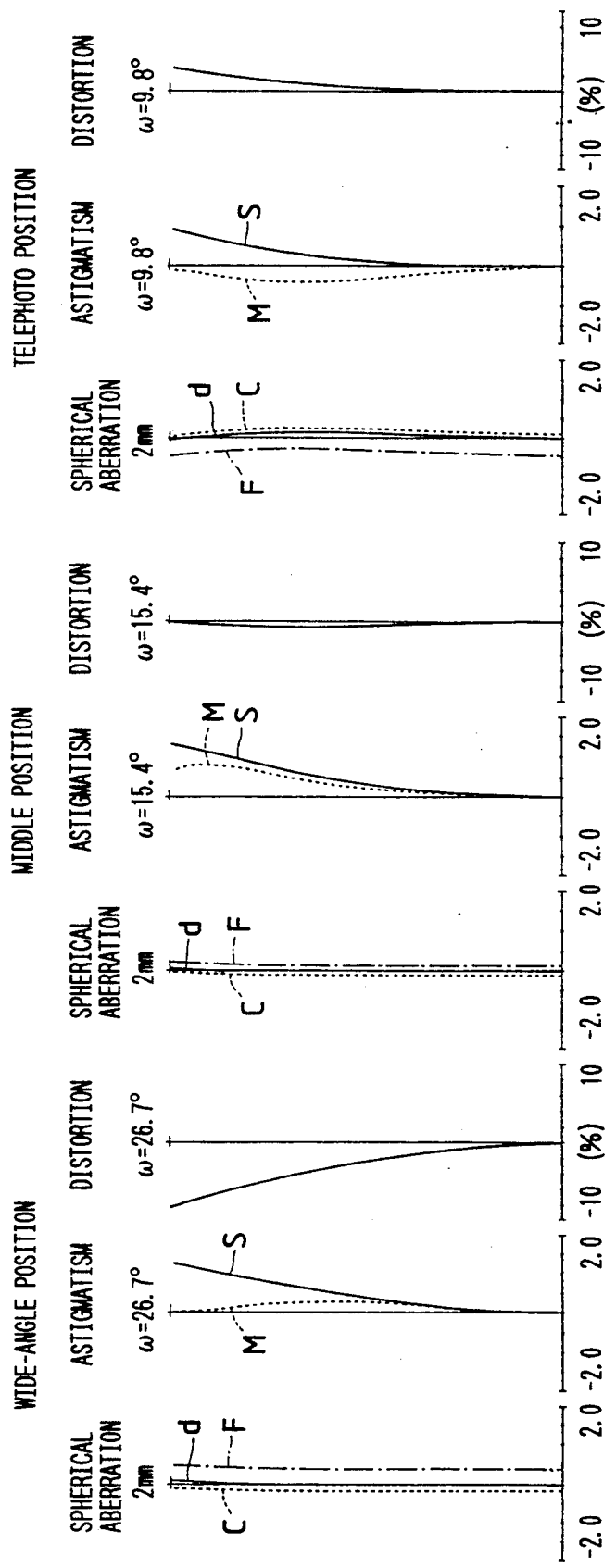

Embodiment 3 has, at the wide-angle position, middle position and telephoto position thereof, the aberration characteristics illustrated in FIG. 7 and designed with the numerical data tabulated below:

Magnification 0.44~1.20,
Field angle (2ω) = 53.4°~19.6°

$r_1 = -50.4139$
 $d_1 = 1.5600$   $n_1 = 1.58362$   $\nu_1 = 30.37$
$r_2 = 18.0604$ (aspherical surface)
 $d_2$ (variable)
$r_3 = 8.4690$ (aspherical surface)
 $d_3 = 4.0220$   $n_2 = 1.49230$   $\nu_2 = 57.71$
$r_4 = -17.1715$
 $d_4 = 0.3873$
$r_5 = 21.1772$
 $d_5 = 1.0000$   $n_3 = 1.58362$   $\nu_3 = 30.37$
$r_6 = 8.2486$
 $d_6$ (variable)
$r_7 = 12.8699$ (aspherical surface)
 $d_7 = 1.6024$   $n_4 = 1.49230$   $\nu_4 = 57.71$
$r_8 = 28.2815$
 $d_8$ (variable)
$r_9 = 11.9246$
 $d_9 = 3.0000$   $n_5 = 1.49230$   $\nu_5 = 57.71$
$r_{10} = \infty$
 $d_{10} = 2.5000$
$r_{11} = \infty$
 $d_{11} = 33.7221$   $n_6 = 1.49230$   $\nu_6 = 57.71$
$r_{12} = \infty$
 $d_{12} = 2.1000$
$r_{13} = 16.5810$ (aspherical surface)
 $d_{13} = 2.8000$   $n_7 = 1.49230$   $\nu_7 = 57.71$
$r_{14} = -48.9180$
 $d_{14} = 16.3000$
$r_{15}$ (eyepoint)

Aspherical coefficients

Second surface
E = −0.15328 × $10^{-3}$, F = 0.10667 × $10^{-4}$,
G = −0.22246 × $10^{-6}$
Third surface
E = −0.41896 × $10^{-3}$, F = 0.60583 × $10^{-5}$,
G = −0.16789 × $10^{-6}$
Seventh surface
E = 0.20847 × $10^{-4}$, F = −0.77204 × $10^{-5}$,
G = 0.22006 × $10^{-6}$
Thirteenth surface
E = −0.51692 × $10^{-4}$, F = 0.53472 × $10^{-4}$, -continued

G = −0.86017 × $10^{-8}$

|  | wide-angle | middle | telephoto |
|---|---|---|---|
| $d_2$ | 15.928 | 6.986 | 1.229 |
| $d_6$ | 11 2.018 | 6.320 | 1.855 |
| $d_8$ | 12.221 | 16.861 | 27.083 |

Condition (1) −0.013
Condition (2) 0.219

Embodiment 4

Figure 8:
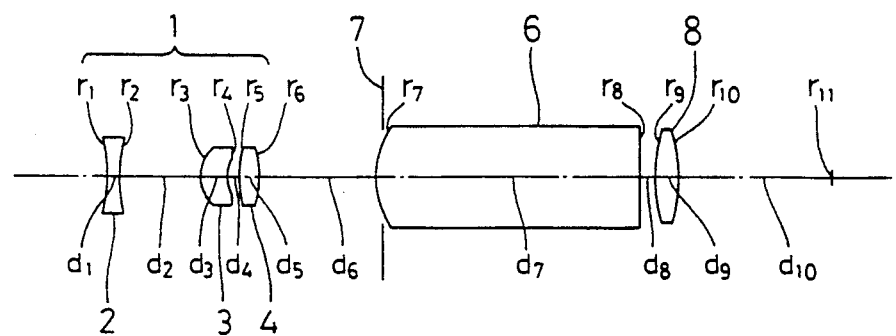
FIG. 8 and FIG. 9 are a development view illustrating composition at the wide-angle position of Embodiment 4 of the present invention and curves visualizing aberration characteristics at the wide-angle position, middle position and telephoto position thereof.

Embodiment 4 has the composition illustrated in FIG. 8, wherein the second lens component 3 of the objective 1 consists of three positive lens elements, and the image erecting optical system is composed of a mirror (not shown) serving as the first reflecting surface $M_1$ and a prism having the second through fourth reflecting surfaces $M_2$ through $M_4$. The surface of incidence of the prism 6 is selected as the intermediate image surface.

Figure 9:
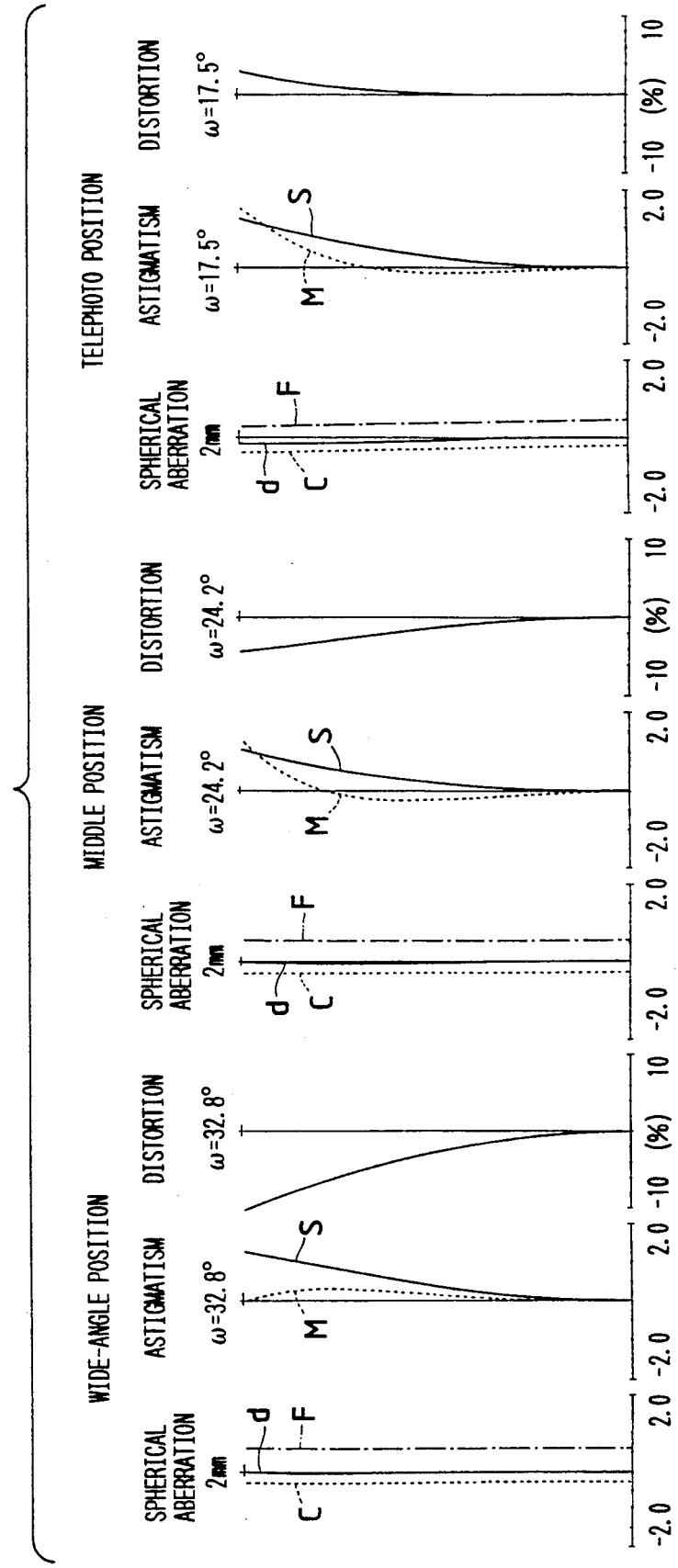

The aberration characteristics at the wide-angle position, middle position and telephoto position of Embodiment 4 are illustrated in FIG. 9. The numerical data for Embodiment 4 are as listed below:

Magnification 0.40~0.75,
Field angle (2ω) = 65.6°~35.1°

$r_1 = -17.1820$
 $d_1 = 1.5600$   $n_1 = 1.58362$   $\nu_1 = 30.37$
$r_2 = 19.9285$
 $d_2$ (variable)
$r_3 = 4.7767$ (aspherical surface)
 $d_3 = 3.2760$   $n_2 = 1.49216$   $\nu_2 = 57.50$
$r_4 = 5.0369$
 $d_4$ (variable)
$r_5 = 10.5020$ (aspherical surface)
 $d_5 = 2.6000$   $n_3 = 1.49216$   $\nu_3 = 57.50$
$r_6 = -12.5581$
 $d_6$ (variable)
$r_7 = 11.4942$
 $d_7 = 33.6465$   $n_4 = 1.49216$   $\nu_4 = 57.50$
$r_8 = \infty$
 $d_8 = 2.1000$
$r_9 = 23.4957$ (aspherical surface)
 $d_9 = 2.8000$   $n_5 = 1.49216$   $\nu_5 = 57.50$
$r_{10} = -26.7500$
 $d_{10} = 16.3000$
$r_{11} =$ (eyepoint)

Aspherical coefficients

Third surface
E = −0.80018 × $10^{-3}$, F = −0.70979 × $10^{-6}$,
G = −0.18476 × $10^{-5}$
Fifth surface
E = −0.33777 × $10^{-3}$, F = 0.82249 × $10^{-5}$,
G = −0.59676 × $10^{-6}$
Ninth surface
E = −0.32497 × $10^{-4}$, F = 0.53472 × $10^{-6}$,
G = −0.86017 × $10^{-8}$

|  | wide-angle | middle | telephoto |
|---|---|---|---|
| $d_2$ | 10.324 | 3.923 | 0.856 |
| $d_6$ | 1.674 | 4.819 | 4.336 |
| $d_8$ | 15.065 | 18.320 | 21.870 |

Condition (1) 0.027
Condition (2) 0.352

Embodiment 5

Figure 10:
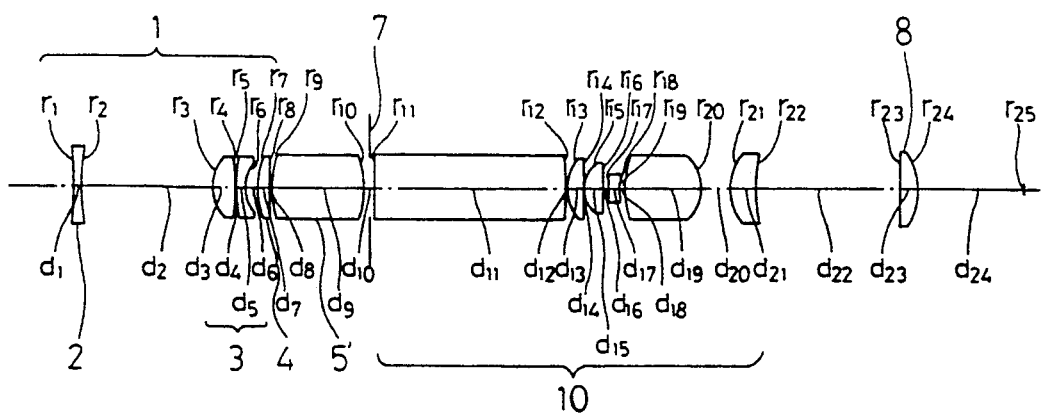
FIG. 10 and FIG. 11 are a development view illustrating composition at the wide-angle position of Embodiment 5 of the present invention and curves visualizing aberration characteristics at the wide-angle position, middle position and telephoto position thereof.

The Embodiment 5 has composition illustrated in FIG. 10, wherein an image erecting optical system is composed of a prism 5' having the first reflecting surface $M_1$ and a relay optical system 10 having the second through fourth reflecting surfaces $M_2$ through $M_4$, an intermediate image surface exists between the prism 5' and the relay optical system 10, and another intermediate surface is arranged between the relay optical system 10 and an eyepiece 8.

Figure 11:
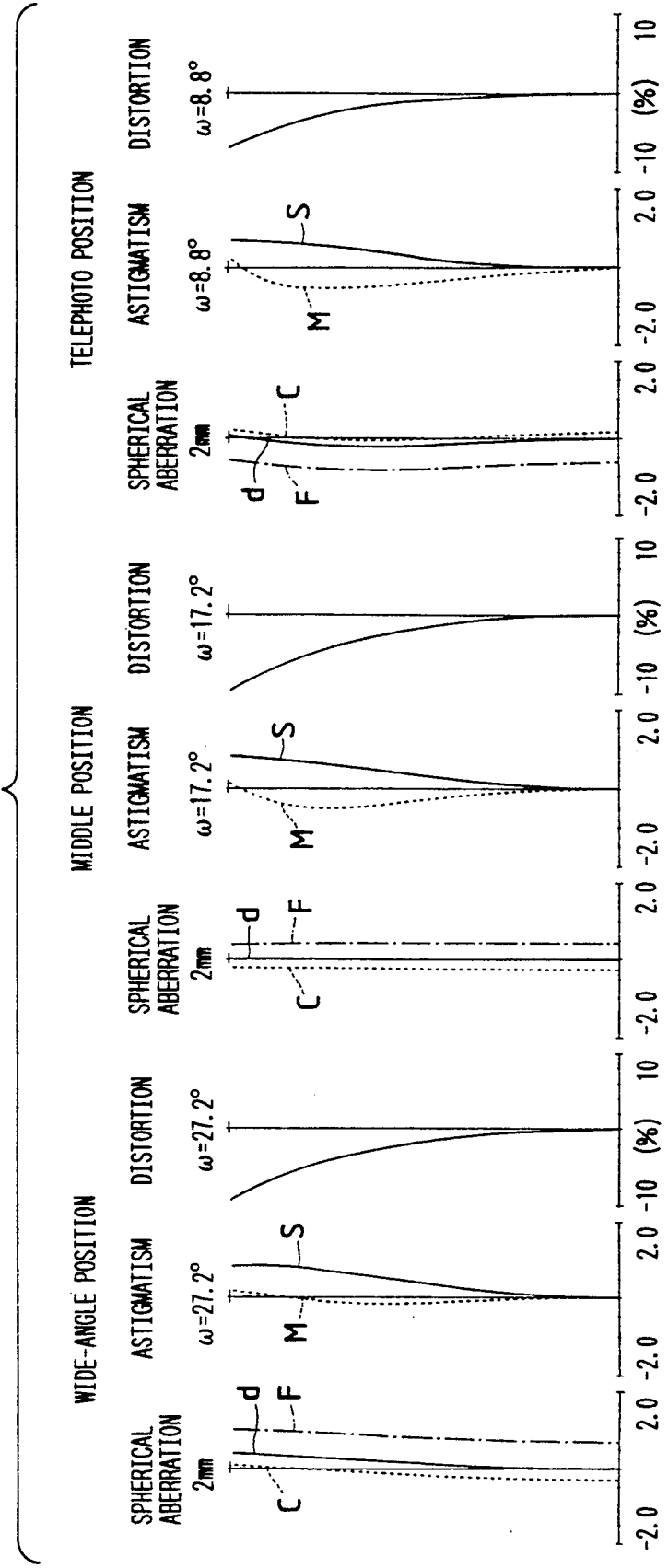

At the wide-angle position, middle position and telephoto position, Embodiment 5 has the aberration characteristics illustrated in FIG. 11. The numerical data adopted for designing Embodiment 5 are listed below:

| Magnification 0.41 ~ 1.26, Field angle (2ω) = 54.4° ~ 17.6° | | | |
|---|---|---|---|
| $r_1 = -77.1642$ | | | |
| | $d_1 = 1.0000$ | $n_1 = 1.58362$ | $\nu_1 = 30.37$ |
| $r_2 = 16.4835$ (aspherical surface) | | | |
| | $d_2$ (variable) | | |
| $r_3 = 6.0138$ (aspherical surface) | | | |
| | $d_3 = 3.3000$ | $n_2 = 1.49260$ | $\nu_2 = 58.02$ |
| $r_4 = \infty$ | | | |
| | $d_4 = 0.3000$ | | |
| $r_5 = 16.8673$ | | | |
| | $d_5 = 1.5053$ | $n_3 = 1.58362$ | $\nu_3 = 30.37$ |
| $r_6 = 5.6579$ | | | |
| | $d_6$ (variable) | | |
| $r_7 = 9.3950$ (aspherical surface) | | | |
| | $d_7 = 1.9067$ | $n_4 = 1.49260$ | $\nu_4 = 58.02$ |
| $r_8 = 61.9176$ | | | |
| | $d_8$ (variable) | | |
| $r_9 = 20.9914$ | | | |
| | $d_9 = 14.5000$ | $n_5 = 1.49260$ | $\nu_5 = 58.02$ |
| $r_{10} = -12.9629$ | | | |
| | $d_{10} = 1.5000$ | | |
| $r_{11} = \infty$ | | | |
| | $d_{11} = 30.0000$ | $n_6 = 1.49260$ | $\nu_6 = 58.02$ |
| $r_{12} = -66.3806$ | | | |
| | $d_{12} = 0.3000$ | | |
| $r_{13} = 6.4227$ (aspherical surface) | | | |
| | $d_{13} = 2.4035$ | $n_7 = 1.49260$ | $\nu_7 = 58.02$ |
| $r_{14} = 52.2278$ | | | |
| | $d_{14} = 0.1089$ | | |
| $r_{15} = 4.5066$ | | | |
| | $d_{15} = 3.0000$ | $n_8 = 1.49260$ | $\nu_8 = 58.02$ |
| $r_{16} = 29.5073$ | | | |
| | $d_{16} = 0.8876$ | | |
| $r_{17} = -19.5167$ | | | |
| | $d_{17} = 1.5000$ | $n_9 = 1.80518$ | $\nu_9 = 25.43$ |
| $r_{18} = 3.3644$ | | | |
| | $d_{18} = 1.0000$ | | |
| $r_{19} = 14.1612$ | | | |
| | $d_{19} = 12.0000$ | $n_{10} = 1.49260$ | $\nu_{10} = 58.02$ |
| $r_{20} = -7.0505$ | | | |
| | $d_0 = 4.8013$ | | |
| $r_{21} = 8.3199$ | | | |
| | $d_{21} = 3.8000$ | $n_{11} = 1.49260$ | $\nu_{11} = 58.02$ |
| $r_{22} = 19.2157$ | | | |
| | $d_{22} = 22.5318$ | | |
| $r_{23} = 63.8227$ | | | |
| | $d_{23} = 2.9000$ | $n_{12} = 1.49260$ | $\nu_{12} = 58.02$ |
| $r_{24} = -10.8033$ | | | |
| | $d_{24} = 15.0000$ | | |
| $r_{25}$ (eyepoint) | | | |

| Aspherical coefficients |
|---|
| Second surface |
| $E = -0.16016 \times 10^{-3}$, $F = -0.20408 \times 10^{-5}$, |
| $G = 0.68511 \times 10^{-7}$ |
| Third surface |
| $E = -0.50618 \times 10^{-3}$, $F = 0.40113 \times 10^{-6}$, |
| $G = -0.39997 \times 10^{-6}$ |
| Seventh surface |
| $E = -0.24422 \times 10^{-3}$, $F = -0.47637 \times 10^{-5}$, |
| $G = 0.21689 \times 10^{-6}$ |
| Thirteenth surface |
| $E = -0.44980 \times 10^{-3}$, $F = -0.78358 \times 10^{-5}$, |
| $G = -0.18367 \times 10^{-7}$ |

| | wide-angle | middle | telephoto |
|---|---|---|---|
| $d_2$ | 20.788 | 9.183 | 0.459 |
| $d_6$ | 1.751 | 8.046 | 3.934 |
| $d_8$ | 0.449 | 5.759 | 18.595 |

| |
|---|
| Condition (1) −0.030 |
| Condition (2) 0.248 |

In the numerical data listed above, the reference symbols $r_1, r_2, \ldots$ represent the radii of curvature on the surfaces of the respective lens elements, the reference symbols $d_1, d_2, \ldots$ designate the airspaces reserved therebetween, the reference symbols $n_1, n_2, \ldots$ denote the refractive indices of the respective lens elements, and the reference symbols $\nu_1, \nu_2, \ldots$ represent the Abbe's numbers of the respective lens elements.

Further, when the direction of the optical axis is taken as X and the direction perpendicular to the optical axis is take as C, the shapes of the aspherical surfaces used in the Embodiments described above are expressed by the formula shown below using the aspherical coefficients:

$$X = \frac{CS^2}{1 + \sqrt{1 - PC^2 S^2}} + ES^4 + FS^6 + GS^8 + HS^{10}$$

wherein the reference symbol C represents the curvature ($=1/r$) as measured at the vertex of the aspherical surface of interest.

In addition, the optical elements used for composing the objective in each of the Embodiments described above are made of plastic materials, but may be made of glass materials so far as the objective can be manufactured at a practically allowable cost.

What is claimed is:

1. A real image mode variable magnification finder optical system disposed separately from a photographing optical system and comprising, in the order from the object side, an objective having a positive refractive power and an eyepiece having a positive refractive power wherein:

said objective comprises a first lens component having a negative refractive power, a second lens component having a positive refractive power and a third lens component having a positive refractive power;

a first reflecting surface for erecting an image is disposed between said third lens component and an intermediate image surface; and said second lens component and said third lens component are moved along the optical axis for variation of magnification and correction of diopter, while keeping said first lens component stationary, so as to set the airspace reserved between said second lens component and said third lens component at a maximum width thereof in the vicinity of a middle field angle.

2. A real image mode variable magnification finder optical system according to claim 1 wherein the object side surface and the image side surface of said second lens component are convex toward the object side and satisfy the following conditions (1) and (2)

$$-2 < \frac{r_{21} - r_{20}}{r_{21} + r_{20}} < 0.2 \quad (1)$$

$$0 < \frac{r_{30} - r_{21}}{r_{30} + r_{21}} < 0.6 \quad (2)$$

wherein the reference symbol $r_{21}$ represents the radius of curvature on the image side surface of the second lens component, the reference symbol $r_{20}$ designates the radius of curvature on the object side surface of the second lens component and the reference symbol $r_{30}$ denotes the radius of curvature on the object side surface of the third lens component.

3. A real image mode variable magnification finder optical system according to claim 1, wherein said finder optical system has a magnification ratio of at least 2.

4. A real image mode variable magnification finder optical system distinct from a photographic optical system, said finder optical system comprising, in the order from the object side, an objective having a positive refractive power and an eyepiece having a positive refractive power, wherein:

said objective includes, in order from the object side, a first lens unit having a negative refractive power, a second lens unit having a positive refractive power and a third lens unit having a positive refractive power;

a first reflecting surface is disposed between said third lens unit and an intermediate image surface; and variation of magnification is performed by moving said second and third lens units along the optical axis while said first lens unit is kept stationary, with an airspace reserved between the second and third lens units being maximized at a middle field angle.

* * * * *